(12) United States Patent
Blank et al.

(10) Patent No.: US 11,181,039 B2
(45) Date of Patent: Nov. 23, 2021

(54) METHOD AND SYSTEM FOR MOUNTING A SUPPLEMENTAL ALTERNATOR TO A VEHICLE

(71) Applicant: HIPPO Power, LLC., Riverside, MO (US)

(72) Inventors: Michael Joseph Blank, Kansas City, MO (US); Pedro Andrés Wettel-Maraver, Overland Park, KS (US); David Lee Messick, Liberty, MO (US); Bradley James Stolz, Gardner, KS (US)

(73) Assignee: HIPPO Power, LLC, Riverside, MO (US)

( * ) Notice: Subject to any disclaimer, the term of this patent is extended or adjusted under 35 U.S.C. 154(b) by 0 days.

(21) Appl. No.: 17/181,891

(22) Filed: Feb. 22, 2021

(65) Prior Publication Data

US 2021/0199048 A1 Jul. 1, 2021

Related U.S. Application Data

(63) Continuation of application No. 16/700,841, filed on Dec. 2, 2019, now Pat. No. 10,927,753.

(60) Provisional application No. 62/773,580, filed on Nov. 30, 2018.

(51) Int. Cl.
| | |
|---|---|
| *F02B 63/04* | (2006.01) |
| *H02K 7/18* | (2006.01) |
| *H02K 7/20* | (2006.01) |

(52) U.S. Cl.
CPC .......... *F02B 63/044* (2013.01); *F02B 63/042* (2013.01); *H02K 7/1815* (2013.01); *H02K 7/20* (2013.01); *F02B 2063/045* (2013.01); *H02K 7/1823* (2013.01)

(58) Field of Classification Search
CPC ............. F02B 63/044; F02B 63/042; F02B 2063/045; H02K 7/1815; H02K 7/1823; H01K 7/20
See application file for complete search history.

(56) References Cited

U.S. PATENT DOCUMENTS

| | | | |
|---|---|---|---|
| 6,371,072 B1 * | 4/2002 | Huber | F02B 63/04 123/195 A |
| 2019/0153935 A1 * | 5/2019 | Richards | F02B 67/06 |
| 2019/0345893 A1 * | 11/2019 | Howard | F02F 7/0068 |

* cited by examiner

*Primary Examiner* — Jacob M Amick
(74) *Attorney, Agent, or Firm* — Shook, Hardy & Bacon LLP

(57) ABSTRACT

A mounting system for mounting a supplemental alternator, as well as methods of assembling the same, is provided. The mounting system includes a top mounting bracket that is configured to align with a top flange aperture of the additional alternator. The mounting system also includes a bottom mounting bracket having a bracket aperture that aligns with an aperture of an existing alternator mount and also having a flange aperture that aligns with the foot flange aperture of the additional alternator. The mounting system further includes a shaft that couples to the additional alternator.

20 Claims, 12 Drawing Sheets

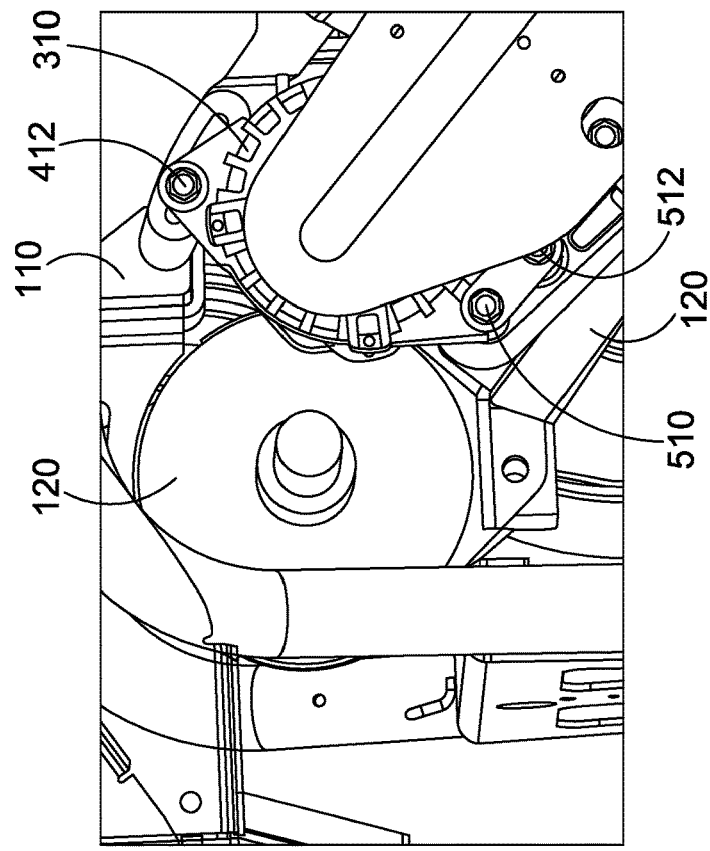
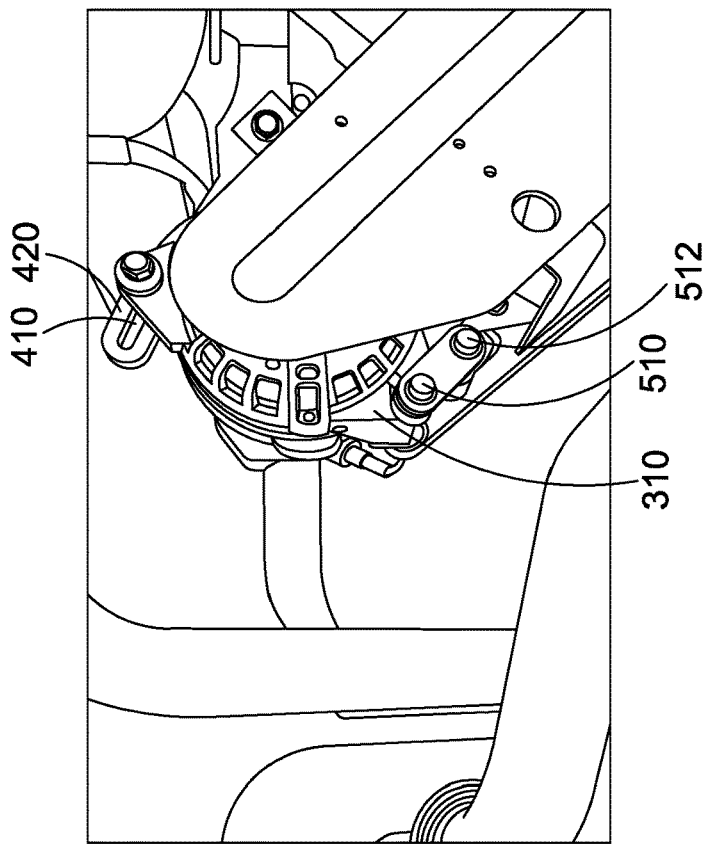
FIG. 4A
FIG. 4B

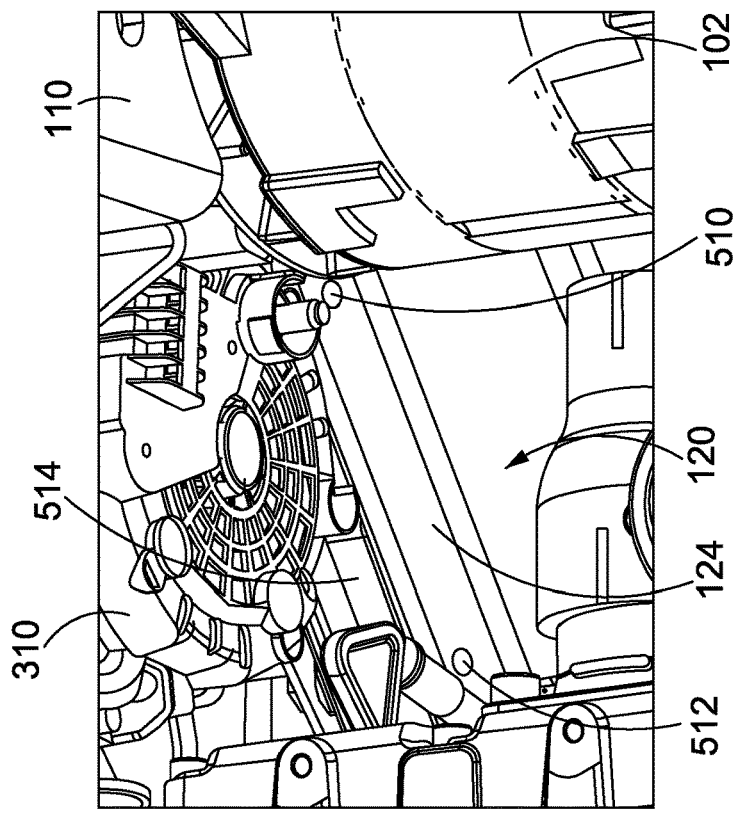
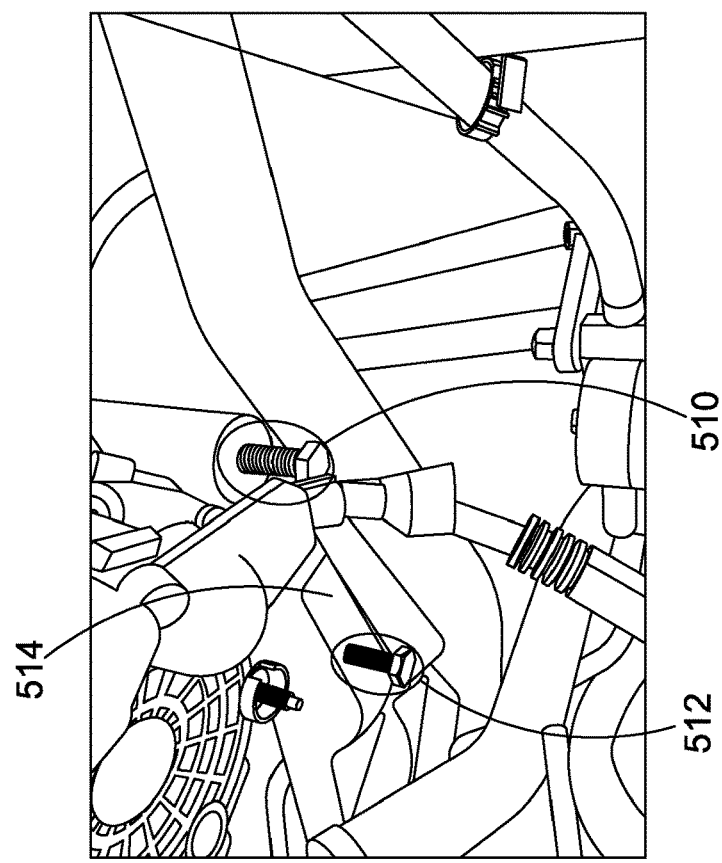

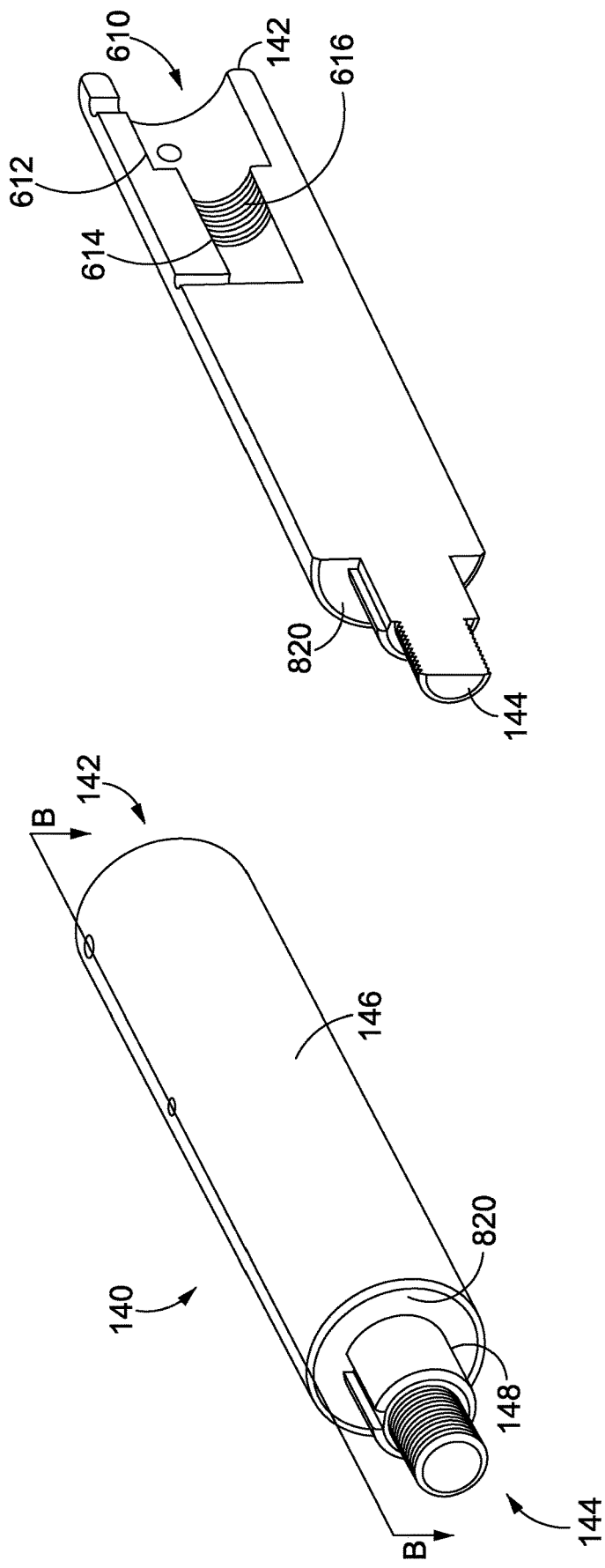

METHOD AND SYSTEM FOR MOUNTING A SUPPLEMENTAL ALTERNATOR TO A VEHICLE

CROSS-REFERENCE TO RELATED APPLICATIONS AND CLAIM OF PRIORITY

This is a continuation application that claims priority benefit of co-pending U.S. patent application Ser. No. 16/700,841, filed Dec. 2, 2019, and entitled "Method And System For Mounting A Supplemental Alternator To A Vehicle," which claims priority benefit of U.S. Provisional Patent Application No. 62/773,580, filed Nov. 30, 2018, and entitled "Method And System For Mounting A Supplemental Alternator To A Vehicle," all of which are hereby incorporated herein by reference in the entirety.

TECHNICAL FIELD

The present invention relates to systems and methods of mounting a supplemental alternator to a vehicle. Much of the discussion that follows will relate to mounting the additional alternator alongside an existing alternator within an engine of an ATV (all-terrain vehicle) or UTV (utility vehicle). However, it is to be appreciated that systems and methods of the present invention could have uses in other vehicles and therefore the invention is not restricted to just an ATV or UTV.

BACKGROUND OF INVENTION

Portable generators are often used in remote locations when electrical power is unavailable ("off grid"). Most portable generators are standalone generators that are stowed during transportation, removed from storage when needed, and then powered up. Portable generators can create a number of problems. For instance, portable generators can take up valuable storage capacity. This is a significant problem for certain types of vehicles that have limited storage space, such as in ATVs (all-terrain vehicles) or UTVs (utility vehicles). In addition, standalone generators may create unwanted weight. As portable generators usually run on independent combustion engines, the combustion engine may introduce additional weight and additional fuel. This is unsatisfactory when an ATV or UTV has a limited amount of weight it can handle.

To further complicate matters, standalone generators must be removed from storage and started. This is a time intensive task as it may involve removing the standalone generator from storage and placing it on the ground. Additionally, removing the standalone generator from storage is cumbersome as the standalone generator may be heavy, introducing opportunities for mishandling (e.g., dropping) the generator. In addition to being cumbersome, time may be wasted in removing the standalone generator from storage and then starting it. As such, standalone generators that must be stowed typically do not provide on-demand electrical power while the vehicle is moving or immediately after the vehicle has been stopped. This is an unsatisfactory solution since certain scenarios require electrical power in on-demand situations while the vehicle is in motion or shortly thereafter. For instance, many military UTVs may require on-demand electrical power to operate counter-measure systems, such as, actively jamming a detonation signal for an improvised explosive device (IED).

There are also problems associated with in-engine mounted generators. For instance, while a vehicle's existing alternator could potentially be used to provide power to auxiliary electrical systems independent of the vehicle, these existing alternators generally cannot meet the demands required by certain auxiliary electrical systems. This is because many vehicles rely on a 12 volt alternator, which cannot produce enough power required for auxiliary electrical systems. This limits the auxiliary electrical systems available for use with the vehicle.

SUMMARY

This summary is intended to introduce a selection of concepts in a simplified form that are further described below in the detailed description section of this disclosure. This summary is not intended to identify key or essential features of the claimed subject matter, and it is not intended to be used as an aid in isolation for determining the scope of the claimed subject matter.

In brief, and at a high level, this disclosure describes mounting an additional alternator within an engine compartment while reducing the time and effort to modify other components within the engine compartment. More specifically, the present disclosure describes methods, apparatuses, and systems for mounting an additional in-engine alternator using offset brackets and an extended shaft. The additional alternator can then be used to supplement the electrical power supplied by the existing vehicle's alternator. In other words, while the existing vehicle alternator typically generates electrical power for the vehicle's electrical system, the additional alternator may generate electrical power to power non-vehicle accessories. Additionally, both the existing vehicle alternator and the additional mounted alternator can be driven by the vehicle's crankshaft. For example, a crankshaft may drive both the existing vehicle alternator (e.g., a 12V alternator) and the additional alternator (e.g., a 24V alternator) through one or more belts.

In one embodiment hereof, a mounting system for mounting an additional alternator in combination with an existing alternator is provided. The mounting system includes a top bracket coupled with a top flange of the additional alternator and a bottom bracket coupled with a bottom flange of the additional alternator. A shaft is coupled to and extends from the additional alternator. A pulley is attached to the shaft adjacent a distal end.

In another embodiment hereof, a method for mounting an additional alternator to a vehicle having an existing alternator. The method include securing a top bracket to an existing engine component and securing a bottom bracket to an alternator mount supporting the existing alternator. The method further includes mounting the additional alternator alongside the existing alternator using the top and bottom brackets.

BRIEF DESCRIPTION OF THE DRAWINGS

The subject matter disclosed herein is described in detail with reference to the attached drawing figures, which are intended to illustrate non-limiting examples of the disclosed subject matter related to supplemental alternators, in which like numerals refer to like elements, wherein:

FIG. 4A is a front perspective view of an existing alternator and an existing mounting system in accordance with some embodiments of the present invention;

FIG. 4B is a front perspective view of an additional alternator mounted to an existing alternator mounting system in accordance with some embodiments of the present invention;

FIG. 5A is a rear perspective view of an existing alternator and an existing mounting system in accordance with some embodiments of the present invention;

FIG. 5B is a rear perspective view of an additional alternator mounted to an existing alternator mounting system in accordance with some embodiments of the present invention;

FIG. 6A is a front perspective view of a shaft in accordance with some embodiments of the present invention;

FIG. 6B is a cross-sectional view of the shaft of FIG. 6A taken in the direction of line B-B in accordance with some embodiments of the present invention;

DETAILED DESCRIPTION

Figure 1:
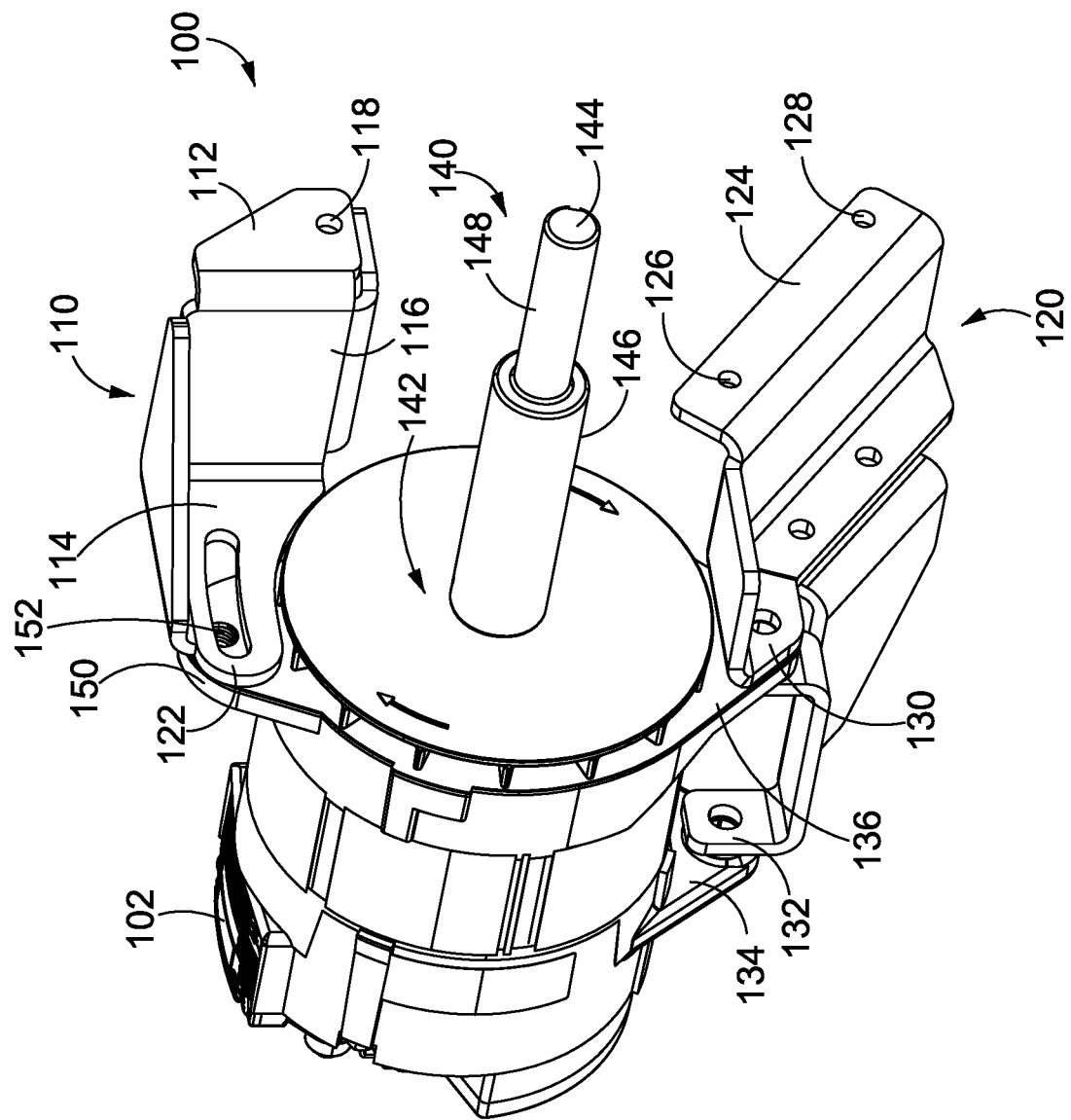
FIG. 1 is a perspective view of a mounting system in accordance with some embodiments of the present invention.

The subject matter of the invention is described herein to meet statutory requirements. However, this description is not intended to limit the scope of the invention. Rather, the claimed subject matter may be embodied in other ways, to include different steps, combinations of steps, features, and/or combinations of features, similar to those described in this disclosure, and in conjunction with other present or future technologies. Moreover, although the terms "step" and/or "block" may be used herein to identify different elements of methods employed, the terms should not be interpreted as implying any particular order among or between various steps or blocks except when the order is explicitly described and required.

At a high level, embodiments described herein relate to retrofitting a vehicle with an additional alternator. The additional alternator can be mounted in combination with an existing vehicle alternator, which typically generates electrical power for vehicle's electrical system. The additional alternator can generate additional electrical power that is needed beyond the vehicle's electrical system.

The additional alternator can be mounted to an existing alternator mount through one or more brackets. The one or more brackets can be an offset bracket that is secured to the existing holes or fasteners utilized by the vehicle's existing alternator or other existing engine components. The offset bracket can offset the additional alternator to the rear of the existing vehicle alternator or the crankshaft pulley of the crankshaft. The one or more brackets may have one or more bracket apertures that align with preexisting apertures in the existing alternator mount or other existing engine components. Accordingly, the offset brackets can utilize fasteners that secure the existing alternator to the existing mount. Additionally, the offset brackets can utilize fasteners that already exist within other portions of the engine compartment. When the additional alternator is mounted, a pulley of the additional alternator can be aligned with a vehicle's crankshaft pulley through an extension shaft so that the vehicle's crankshaft pulley can drive the additional alternator. In some aspects, the additional alternator pulley can also be aligned with a pulley of the existing alternator such that both alternators are driven by the vehicle's crankshaft utilizing a common belt.

The extension shaft can be coupled to the additional alternator to bring the additional alternator pulley into the same plane as the vehicle's crankshaft pulley or the existing alternator pulley. Based on its dimensions and material, the extension shaft is capable of withstanding the torque that is created based on offsetting the additional alternator. In some aspects, the extension shaft is supported by a bearing to further withstand the torque. One or more belts can be utilized so that a crankshaft pulley attached to the vehicle's internal combustion engine drives both the additional alternator and the existing alternator. In some aspects, a single belt can drive both alternators.

FIG. 1 is a perspective view of a mounting system 100 for an additional alternator 102 according to an embodiment of the present invention. In general, the mounting system 100 can be used to retrofit a vehicle with the additional alternator 102. The mounting system 100 may allow the additional alternator 102 to be mounted within an engine compartment of the vehicle. The vehicle can thus have dual alternators that can provide power to both the vehicle's electrical system and the auxiliary electrical system. In some aspects, the dual alternators may independently power each respective electrical system. For example, an existing alternator can power a vehicle's electrical system (charge the vehicle battery, provide power to the headlights, etc.), while the additional alternator 102 can provide power to electrical systems that are independent of the vehicle's electrical system.

In some aspects, the electrical power output of the alternators varies. For example, the existing alternator can be a 12V DC alternator that provides the necessary electrical power to the vehicle's electrical system. The additional alternator 102 can be a 24V DC alternator that provides the necessary electrical power to a secondary electrical system requiring a greater electrical load than the vehicle's electrical system (e.g., non-vehicle or auxiliary electrical systems).

Figure 3:
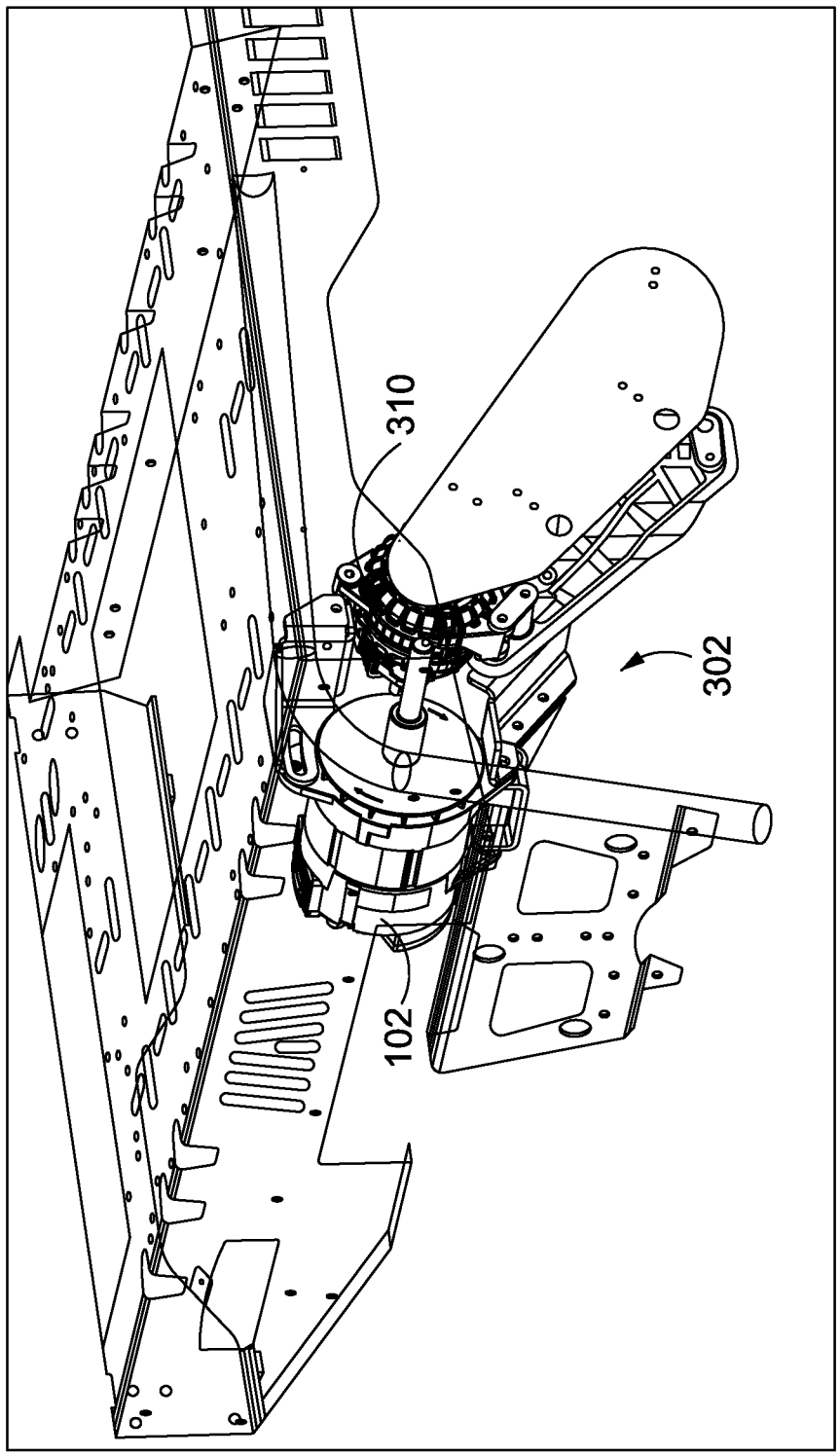
FIG. 3 is a perspective view of an additional alternator mounted to an existing alternator mounting bracket in accordance with some embodiments of the present invention.

As described, the additional alternator 102 may be mounted within the engine compartment 302 of a vehicle, as shown in FIG. 3. The additional alternator 102 and the existing alternator 310 can share a common alternator mount (sometimes referred to herein as the existing alternator mount). For example, as shown in FIG. 3, the additional alternator 102 can be mounted to an existing alternator mount that is used to mount the existing alternator 310. To facilitate a quicker installation, one or more brackets may be configured to mount the additional alternator 102 to the existing alternator mounting bracket.

The mounting system 100 may comprise an extension shaft or shaft 140 having a first or proximal end 142 and a second or distal end 144. As illustrated in FIG. 1, the first end 142 of the shaft 140 can be coupled to a shaft 104 (FIG. 7) of the additional alternator 102 while the second end 144 can be coupled to a pulley 810 (FIG. 8). The shaft 140 may be adapted to fit, mate, or otherwise couple with the shaft of the additional alternator 102 (e.g. through a "slip fit"). The shaft 140 can then be secured to the additional alternator 102 using one or more extension shaft fasteners. In some aspects, the shaft 140 may be configured to slip over the shaft of the additional alternator and held in place by a key by one or more set screws. As discussed in greater detail below, the shaft 140 may be an extended shaft that brings the pulley 810 of the additional alternator 102 into alignment (e.g., within the same plane) with the existing alternator's pulley and/or the vehicle's crankshaft pulley. In some aspects, the shaft 140 creates a greater distance between the additional alternator pulley 810 and the face of the additional alternator 102 than the distance between a face of the existing alternator and its pulley.

The mounting system 100 may further comprise one or more belts (not shown). Utilizing the one or more belts, the vehicle's crankshaft pulley can drive both the existing alternator 310 and the additional alternator 102. Typically, the vehicle's crankshaft pulley drives a pulley of the vehicle's existing alternator. When mounted, the additional alternator 102 can also be driven by the vehicle's crankshaft pulley by one or more belts, either in series or independently with the existing alternator. For instance, in various aspects, a single belt simultaneously drives both the additional alternator 102 and the existing alternator 310. As discussed below, the pulley of the additional alternator 102 may be aligned with the pulley of the existing alternator 310 such that a single belt drives both alternators. The single belt can thus be longer than the existing belt so as to connect both the additional alternator 102 and the existing alternator 310 in series.

In some aspects, two belts are utilized to drive both alternator pulleys. A first belt can independently drive a pulley of the additional alternator 102 while a second belt can independently drive a pulley of the existing alternator 310. In other words, the additional alternator 102 and the existing alternator 310 can be independently driven by the crankshaft through separate belts.

While not shown, the mounting system 100 can further comprise a protective guard. The protective guard can replace an existing protective guard to shield the pulley of the additional alternator 102 and the belt driving the additional alternator. One such example is the belt guard 1146 of FIG. 10.

As noted above, the mounting system 100 may comprise one or more brackets. For instance, the mounting system 100 may comprise a top bracket 110, a bottom bracket 120, or a combination thereof (as shown in FIG. 1). In general, the brackets can offset the additional alternator 102 from the existing alternator 310 such that a front face of the additional alternator 102 is positioned behind (or to the rear of) a front face of existing alternator 310. Utilizing offset brackets can allow an additional alternator to be mounted in an engine without significant modifications to other components of the engine.

The mounting system 100 can utilize existing holes in an existing alternator mount through one or more bracket apertures. For instance, the one or more bracket apertures in the top bracket 110 and the bottom bracket 120 can be adapted to align with one or more existing apertures in the alternator mount. As the brackets of the mounting system 100 can utilize existing holes in the alternator mount, the one or more bracket apertures can remove any need for additional drilling during the installation of the additional alternator 102. Accordingly, the one or more bracket apertures increase the efficiency and safety of installing the additional alternator 102.

As illustrated in FIG. 1, the top bracket 110 may comprise a first wall 112 and a second wall 114. The first wall 112 and the second wall 114 can be separated by a third wall 116 extending there between. In some aspects, the first wall 112, the second wall 114, and the third wall 116 form a Z-bracket. While not necessary, the top bracket 110 can be a unitary structure. The first wall 112 may comprise a bracket aperture 118 (also referred to as first wall aperture). The bracket aperture 118 may be located on the first wall 112 such that it may be aligned with an aperture (also referred to as an existing aperture) in an existing alternator mount when the top bracket is secured to the existing alternator mount. For instance, as shown in FIGS. 4A-B, the bracket aperture 118 of the top bracket 110 can be aligned with an elongated slot 410 in a first member 420 of an existing alternator mount. A fastener (e.g., a bolt, screw, or pin) can then secure the first wall 112 to the first member 420 of the existing alternator mount by extending through both the elongated slot 410 and the bracket aperture 118. It should be appreciated that, in some aspects, the fastener may be a common fastener 412 that secures both the top bracket 110 and the existing alternator 310 to the first member 420 of the existing alternator mount.

Returning to FIG. 1, the additional alternator 102 can be mounted to the second wall 114 of the top bracket 110. For instance, the additional alternator 102 may comprise a top flange 150 having a flange aperture 152 that is alignable with a mounting aperture 122 in the second wall 114. In some aspects, the mounting aperture 122 in the second wall 114 can be an elongated slot having an arc. As such, the additional alternator 102 can be rotatably adjusted with respect to the top bracket 110.

As noted, the mounting system 100 may comprise a bottom bracket 120. The additional alternator 102 can be coupled to the existing alternator mount through the bottom bracket 120. While not necessary, the bottom bracket 120 may be a unitary structure. In the illustrated embodiment, the bottom bracket is formed from two pieces that have been coupled together to act as one. The bottom bracket 120 may comprise a first wall 124 that can be secured to the existing alternator mount. For example, as shown in FIG. 5A, the first wall 124 can be secured to a second member 514 of an existing mount. The bottom bracket 120 may comprise one or more bracket apertures (e.g., apertures 126, 128) positioned on the first wall 124 such that they align with one or more existing apertures in the second member 514 when the bottom bracket 120 is secured to the existing alternator mount. In some aspects, the first wall 124 can be secured to the second member 514 of the existing alternator mount utilizing one or more fasteners.

As shown in FIGS. 5A-5B, the one or more fasteners (bolt, screw, pin, etc.) utilized to secure the bottom bracket 120 to the existing alternator mount may further secure the existing alternator 310 to the existing alternator mount. In other words, the bottom bracket 120 of the additional alternator 102 can share a common fastener with the existing alternator 310. For instance, as shown in FIGS. 5A-B, one or more fasteners 510, 512 can be used to mount the first wall 124 of the bottom bracket 120 to the second member 514 of the existing alternator mount. The one or more fasteners 510, 512 can further secure the existing alternator 310 to the existing alternator mount, as shown in FIG. 4A.

The additional alternator 102 can be mounted to the existing alternator mount through the bottom bracket 120. The additional alternator 102 can be mounted to the bottom bracket 120 through one or more fasteners that secure the additional alternator 102 to the bottom bracket 120. In various aspects, the one or more fasteners can secure the additional alternator 102 to the bottom bracket 120 utilizing one or more mounting flanges of the bottom bracket 120. For instance, the one or more mounting flanges of the bottom bracket 120 can be secured to one or more foot flanges of the additional alternator 102. As shown in FIG. 1, the one or more mounting flanges 130, 132 of the bottom bracket 120 can be spaced apart to engage corresponding foot flanges 136, 134, respectively, of the additional alternator 102. The mounting flanges 130, 132 can be aligned with the two foot flanges 136, 134 such that the apertures of each are aligned. In other words, an aperture in each of the one or more mounting flanges 130, 132 can be aligned with an aperture in each of the foot flanges 136, 134. One or more fasteners (e.g., bolt, screw, and pin) may then be inserted through the apertures of the corresponding mounting flanges and secure the additional alternator 102 to the bottom bracket 120.

In some aspects, the mounting system may further comprise a shaft 140. The shaft 140 can be a cylindrical member extending from a first end to a second end. As illustrated in FIG. 1, the shaft 140 can be attached to the additional alternator 102 by any known means (welding, screw threads, pins, latch, etc.). The first or proximal end 142 may be positioned near the face of the additional alternator 102. The shaft 140 can also be coupled to a pulley (e.g., pulley 810 as shown in FIG. 8), such as at or adjacent the second or distal end 144. In a mounted position, the shaft can extend perpendicular to the first and second walls 112, 114 of the top bracket 110. Additionally, the shaft 140 can extend parallel to the third wall 116 of the top bracket 110.

Further, in various aspects, the shaft 140 may comprise a plurality of concentric cylindrical portions having varying diameters. For example, as shown in FIG. 1, the shaft 140 may comprise a base portion 146 having a greater diameter than a diameter of an extended portion 148. The base portion 146 can be a greater diameter to allow it to slip over a shaft of the additional alternator 102, which is concealed in FIG. 1 by the shaft 140. The extended portion 148 can generally be defined as a portion of the shaft 140 that extends beyond the shaft of the additional alternator 102.

In some aspects, the shaft 140 can be designed to account for the moment created by the belt that drives the additional alternator pulley at the second end 144. As described above, the additional alternator 102 can be offset from the existing alternator 310 using one or more brackets. Because the existing alternator 310 is offset, a belt driving the pulley at the second end 144 of the shaft 140 can create a side load that causes the shaft 140 to bend. In other words, because the shaft 140 extends the shaft of the additional alternator 102, the additional alternator pulley will be further away from the face of the additional alternator 102. This may cause a greater side load on the extended portion 148 at the second end 144 of the shaft 140, thereby introducing a greater moment than what is otherwise experienced by a non-extended alternator shaft. In some aspects, to account for the greater moment, the base portion 146 and the extended portion 148 may have substantially similar outer diameters or may have different ratios of length, as shown in FIGS. 6A-6B.

Figure 7:
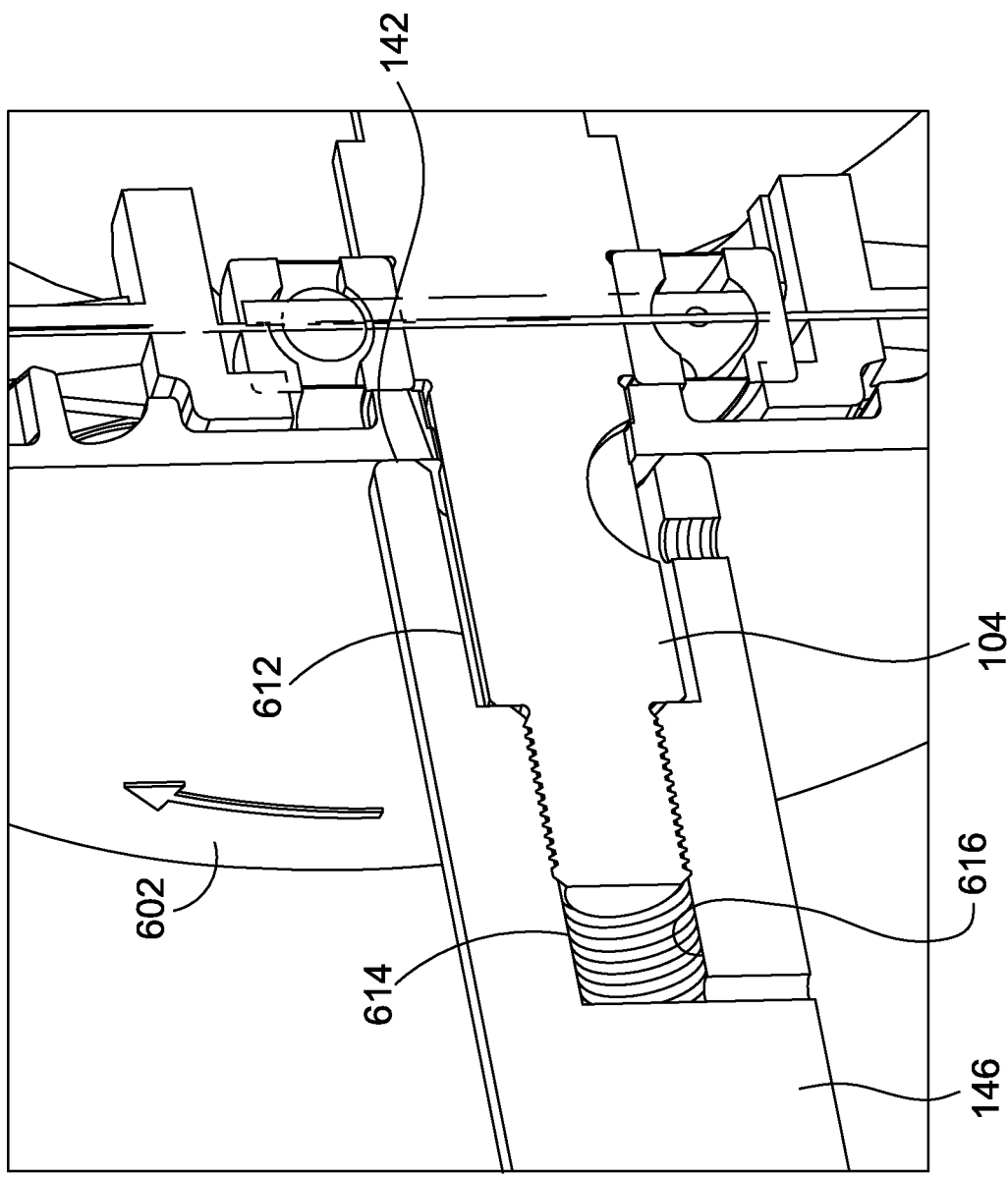
FIG. 7 is a cross-sectional view of the shaft of FIG. 6A in a mounted position to the crankshaft of an additional alternator in accordance with some embodiments of the present invention.
Figure 8:
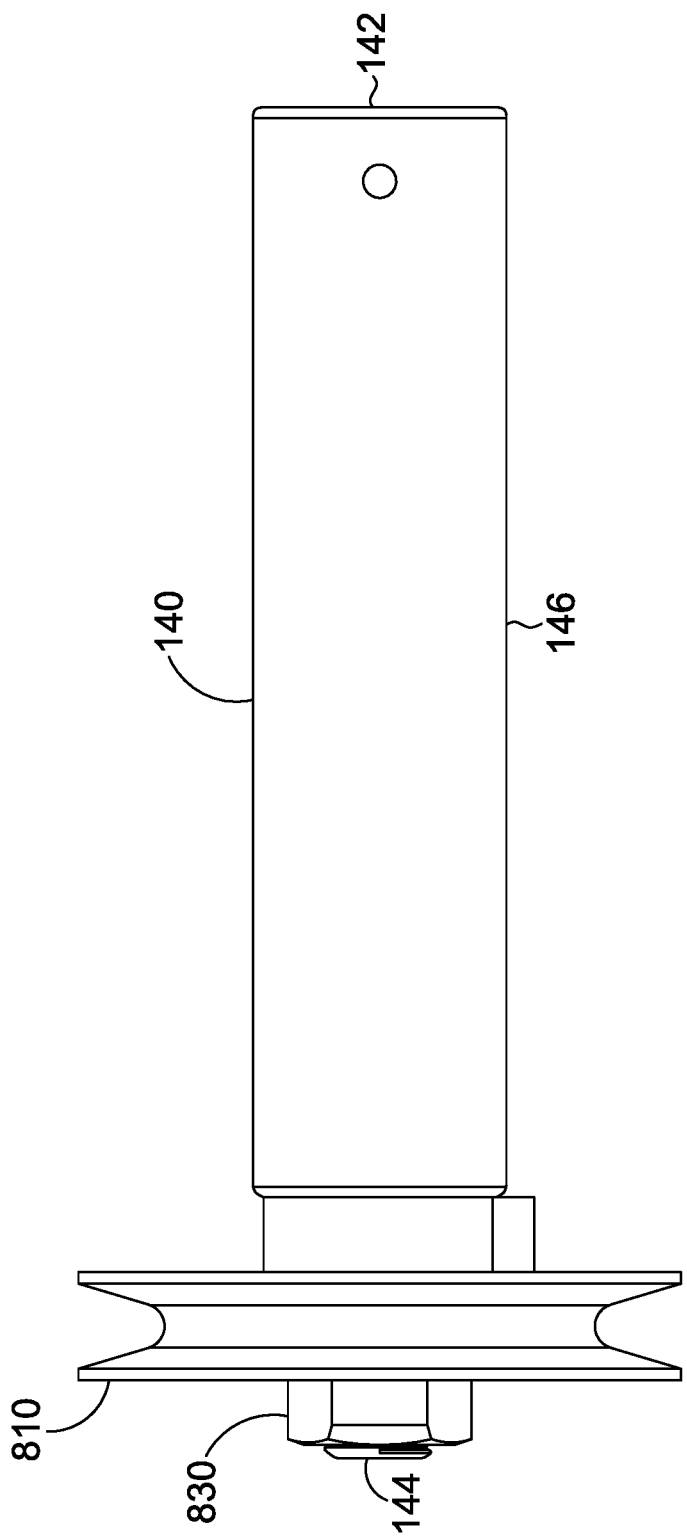
FIG. 8 is a side elevation view of the shaft of FIG. 6A with a pulley thereon in accordance with some embodiments of the present invention.

With reference to FIGS. 6A-7, the proximal end 142 of the shaft 140 may comprise a bore 610 to receive the shaft 104 of the additional alternator 102. Generally, the dimensions of the bore 610 (e.g., diameter, depth, width, or height) allow the shaft 140 to fit over the shaft 104 of the additional alternator 102. The bore 610 can extend lengthwise along a central longitudinal axis of the shaft 140 (i.e., the axis extending from the proximal end 142 to the distal end 144). Additionally, the dimensions of the bore 610 are such that they allow the shaft 140 to be supported by the additional alternator 102 (e.g., by the proximal end 142 coming into contact with a surface of a fan plate 602 of the additional alternator 102). For example, the dimensions of the bore 610 can allow the shaft 140 to receive a portion of the alternator shaft 104 that extends beyond the fan plate 602 of the additional alternator 102 such that the proximal end 142 of the shaft 140 is reinforced by the additional alternator 102. In some aspects, the proximal end 142 is reinforced by directly contacting the outer surface of the fan plate 602 of the additional alternator 102. In some aspects, the proximal end 142 does not directly contact the surface, but is otherwise reinforced by the fan plate 602 via one or more intermediate layers between the proximal end 142 and the outer surface of the fan plate 602 of the additional alternator 102. This can be advantageous because, in exemplary aspects, the shaft 140 can extend the pulley further away from the face of the additional alternator 102. Extending the pulley creates a greater risk that the shaft 140 becomes unsecured or off-balanced due to the greater moment created by a larger distance between the pulley 810 and the face of the additional alternator 102 than would normally occur without use of the shaft 140. As such, when the shaft 140 is rotating, especially at high speeds, it is likely to rattle or wobble. However, by including internal threads in the bore 610 and external threads on an outer portion of the shaft 104 of the additional alternator 102, a mechanical force may be applied between the proximal end 142 of the shaft 140 and a the outer surface of the fan plate 602 to eliminate any gap there between and to cause the shaft 140 and the fan plate 602 to act and function as one piece, thereby greatly reducing or eliminating possible rattling and wobbling.

In some embodiments, the bore 610 can include two concentric chambers to receive the additional alternator shaft. As shown in FIG. 7, the bore 610 may include an outer chamber 612 and an inner chamber 614. The outer chamber 612 can extend from the opening in the proximal end 142 of the shaft 140 and along the longitudinal axis of the shaft. In some aspects, the outer chamber 612 transitions to the inner chamber 614, which engages or mates to the additional alternator shaft 104. As described below, the inner chamber 614 can include a mating mechanism that engages the additional alternator shaft. In some embodiments, the outer chamber 612 and the inner chamber 164 are cylindrical chambers. The outer chamber 612 can have a larger diameter with respect to the diameter of the inner chamber 614. In addition, the diameter of the outer chamber 612 is larger than a diameter of the drive shaft 104 of the additional alternator 102.

In some embodiments, the inner chamber 614 engages a portion of the alternator shaft by way of a mating mechanism. The mating mechanism can ensure that the proximal end 142 of the shaft 140 is continually reinforced by the outer surface of the fan plate 602 of the additional alternator 102 (e.g., by coming into contact with the fan plate 602 of the additional alternator 102). In some aspects, the inner chamber 614 can include a screw thread 616 that mates with a screw thread of the shaft 104. The orientation of the screw thread 616 can be such that the shaft 140 will tighten on the shaft 104 of the additional alternator 102 as the pulley 810 of the shaft 104 is being rotated by a belt. In other words, while the vehicle's engine is running and the belt is causing the shaft 140 to rotate, the orientation of the screw thread 616 will cause the shaft 140 to tighten with respect to the alternator shaft 104. It should be appreciated that as the shaft 140 is tightened, the proximal end 142 of the shaft 140 is forced toward the additional alternator 102. This can result in causing the proximal end 142 of the shaft 140 to clamp down against the outer surface of the fan plate 602 of the additional alternator 102.

Figure 10:
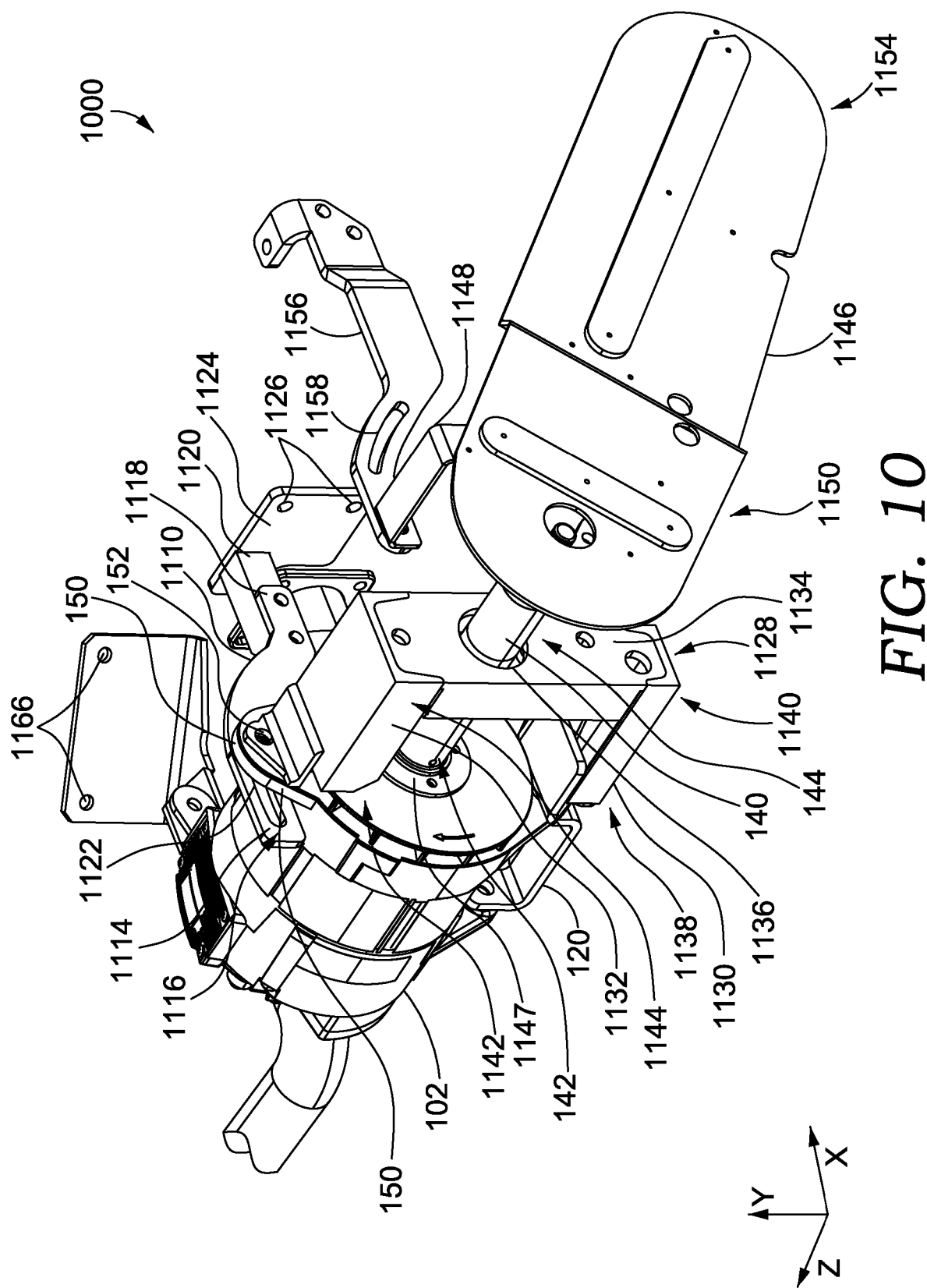
FIG. 10 is a front perspective view of an additional alternator mounted to an existing alternator mounting bracket in accordance with alternate embodiments of the present invention.

In some embodiments, to account for the greater side load, the shaft 140 may be reinforced by a bearing, such as the bearing support system 1128 as described in reference to FIG. 10. For example, the base portion 146 or extended portion 148 of the shaft 140 may extend through an opening in a support bearing. The support bearing allows the shaft 140 to rotate while ensuring that the extended portion 148 of the shaft 140 does not bend or break due to the force created by a belt driving the pulley of the shaft 140.

Figure 2B:
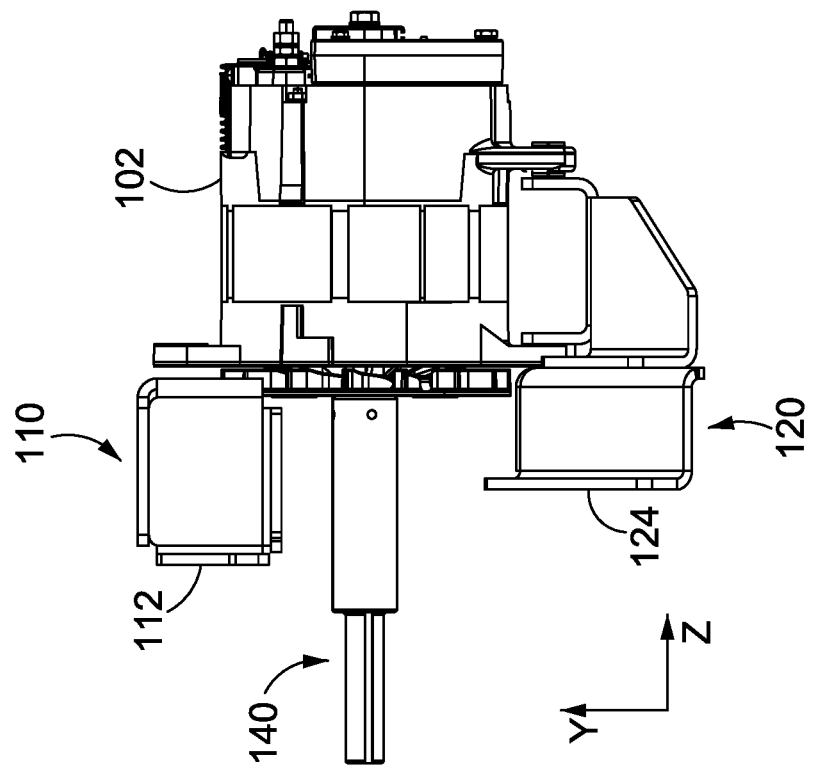
FIGS. 2A-B are rear and side elevation views, respectively, in accordance with some embodiments of the present invention.
Figure 2A:
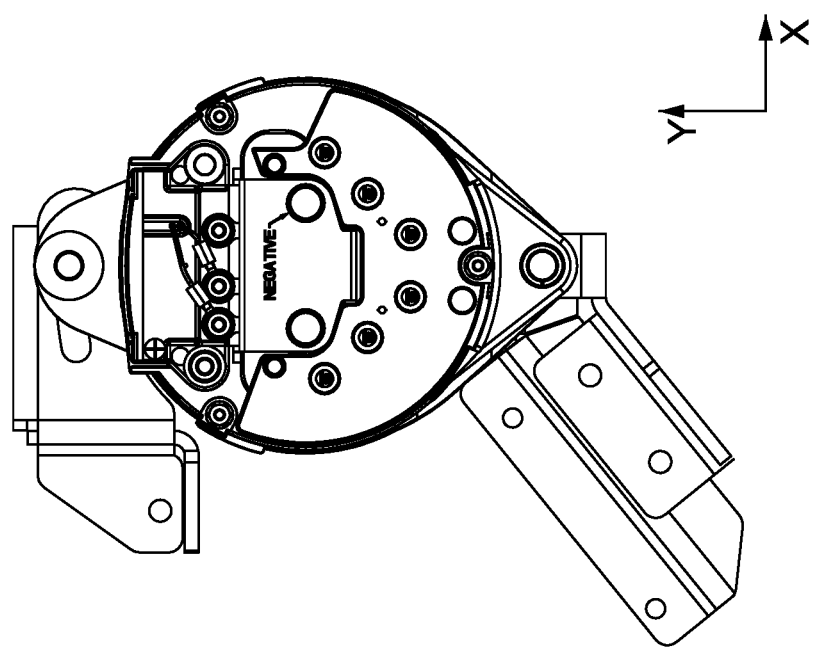

As described herein, in various aspects, the additional alternator 102 can be offset from the existing alternator 310. By offsetting the additional alternator 102, it may allow the additional alternator 102 to be mounted within the engine compartment 302. Additionally, offsetting the additional alternator 102 may allow it to be mounted utilizing apertures in the existing alternator mount. This may reduce the installation time since it would not require further drilling. As shown in FIGS. 2B, 3, and 5B, the additional alternator 102 can be offset from the existing alternator 310. For example, the face of the additional alternator 102 may be offset from the face of the existing alternator. Said differently, the solenoid of the additional alternator 102 can be offset from the solenoid of the existing alternator 310. The mounting system 100 can facilitate offsetting the additional alternator 102 in one or more of the x-axis, y-axis, and z-axis. As used herein, the x-axis illustrates a lateral direction, the y-axis illustrates a vertical direction, and the z-axis illustrates a longitudinal direction.

Turning now to FIG. 2B, in some aspects, the shaft 140 can extend from the additional alternator 102 beyond the top bracket 110 and bottom bracket 120. Specifically, the shaft 140 can extend from a first end 142 that is secured to a shaft of the additional alternator 102 and extend through the second end 144. When the additional alternator 102 is mounted in an offset position, the second end 144 of the shaft 140 can extend beyond the first wall 112 of the top bracket 110 (in addition to the second and third walls 114, 116). Additionally, the second end 144 of the shaft 140 can extend beyond the first wall 124 of the bottom bracket 120. As such, the shaft 140 can extend the shaft 104 of the additional alternator 102 to bring the pulley 810 within the same plane as the crankshaft pulley or the pulley of the existing alternator 310.

Turning now to FIG. 8, an exemplary side elevation view of the shaft 140 and the pulley 810 is depicted in accordance with some embodiments of the present invention. The shaft 140 may be configured to secure or couple the pulley 810 to the extended portion 148 adjacent the distal end 144. For example, the extended portion 148 of the shaft 140 can have a diameter that allows the shaft 140 to extend from a first side of the pulley 810, through an opening in the pulley 810, and beyond a second side of the pulley 810. The portion of the extended portion 148 extending beyond the second side of the pulley 810 adjacent the distal end 144 can include a screw thread that mates with a nut 830. As such, the nut 830 can be mated with the portion of the extended portion 148 extending beyond the second side of the pulley 810, thereby securing the pulley 810 to the shaft 140.

In the embodiment illustrated in FIGS. 6A-8, the transition from the larger diameter base portion 146 to the smaller diameter extended portion 148 defines a stop collar 820 that helps set the lateral position of the pulley 810 on the shaft 140. In particular, the collar 820 orients the pulley 810 in a predefined position that allows the pulley 810 to be aligned with the pulley of the crankshaft or existing alternator. The collar 820 can be advantageous as it may increase the safety of the installation of additional alternator 102. For instance, the collar 820 can eliminate the potential of human error in misaligning the pulley 810 with the crankshaft pulley or the pulley of the existing alternator. In some aspects, the collar 820 may be a unitary structure with the shaft 140. In some aspects, the collar 820 may be joined, coupled, or otherwise mated to the shaft 140.

Figure 9:
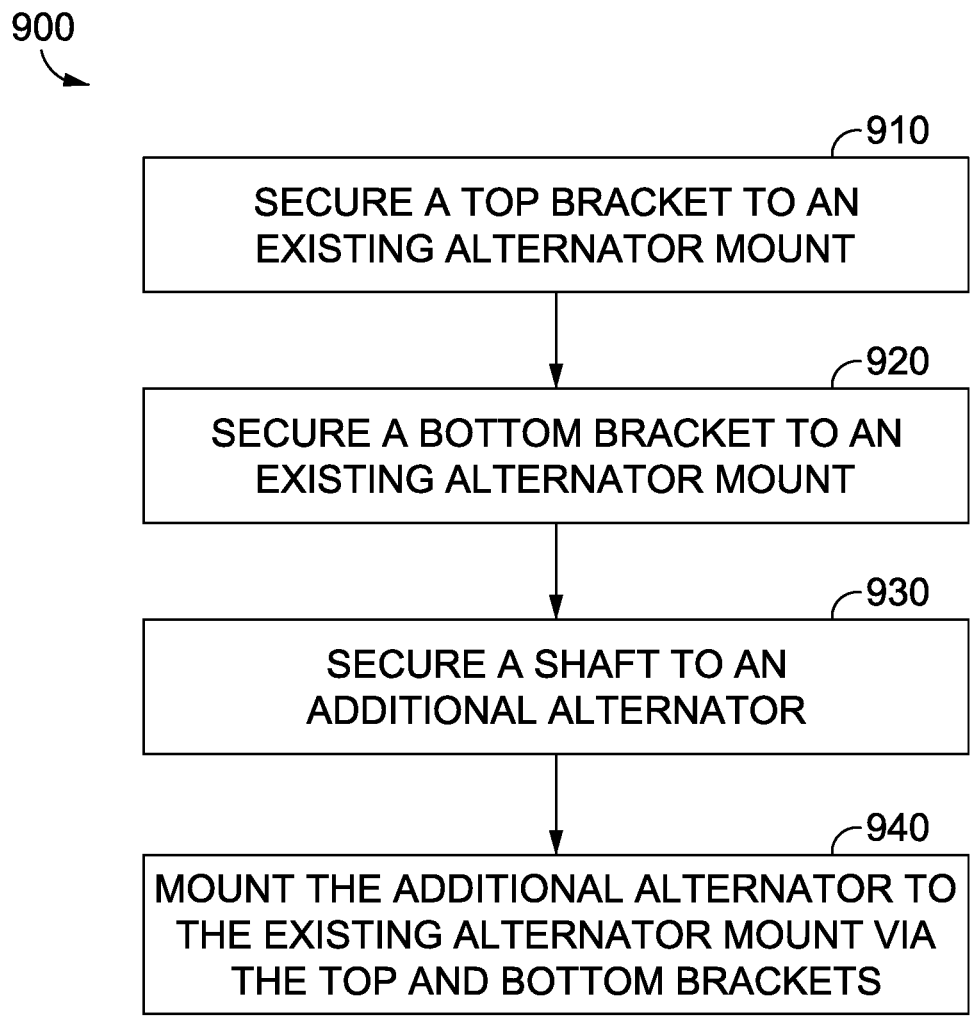
FIG. 9 is a flow diagram showing a method for retrofitting an engine with an additional alternator in accordance with some embodiments of the present invention.

FIG. 9 is a flow diagram showing a method 900 for retrofitting an engine with an additional alternator in accordance with some embodiments of the present invention. At step 910, a top bracket is secured to an existing alternator mount. As described herein, in various aspects, the first wall 112 of the top bracket 110 can be secured to the first member 420 of the existing alternator mount. For instance, a bracket aperture 118 in the first wall 112 of the top bracket 110 can be aligned with an existing aperture (e.g., the elongated slot 410) in the first member 420 of the existing alternator mount. A fastener can then be inserted through both the first wall 112 of the top bracket 110 and the first member 420 of the existing alternator mount. In some aspects, the fastener can also be utilized to secure the existing alternator 310 to the first member 420 of the existing alternator mount. As such, the top bracket 110 and the existing alternator 310 may share a common fastener while being secured to the first member 420.

At step 920, a bottom bracket can be secured to the existing alternator mount. For instance, in some aspects, the first wall 124 of the bottom bracket 120 may be secured to the second member 514 of the existing alternator mount. In particular, one or more bracket apertures 126, 128 in the first wall 124 of the bottom bracket 120 may be aligned with one or more existing apertures in the second member 514 of the existing alternator mount. One or more fasteners (e.g., fasteners 510, 512) may then be inserted through both the one or more bracket apertures 126, 128 and the one or more existing apertures in the second member 514 of the existing alternator mount. In some aspects, the one or more fasteners may further secure the existing alternator 310 to the second member 514. As such, the bottom bracket 120 and the existing alternator 310 may share one or more common fasteners while being secured to the second member 514.

At step 930, a shaft (e.g., shaft 140) can be secured to an additional alternator 102. As described, the shaft 140 generally has a first end 142 and second end 144. The shaft 140 can be attached to the additional alternator 102 at the first end 142 by any means known in the art, such as through welding. The shaft 140 can be attached such that it drives a rotor within the additional alternator 102. For example, the shaft 140 may be attached to a rotor shaft that drives the rotor within the additional alternator 102. As described herein, the shaft 140 may be an extended shaft that extends beyond the flanges of either the top or bottom mounting bracket 110, 120. In various aspects, the shaft 140 may have a greater diameter at the first end 142 than its diameter at the second end 144.

At step 940, the additional alternator 102 may be mounted to the existing alternator mount via at least one of the top and bottom brackets 110, 120. As described above, the additional alternator 102 may be secured to the top bracket 110 or bottom bracket 120, or a combination thereof. For instance, the top flange 150 of the additional alternator 102 may comprise a flange aperture 152. During the installation of the additional alternator 102, the flange aperture 152 of the top flange 150 can be aligned with the mounting aperture 122 in the second wall 114 of the top bracket 110. A fastener can then be inserted through the flange aperture 152 of the top flange 150 and the mounting aperture 122 in the second wall 114 and secure the additional alternator 102 to the top bracket 110. As described in step 910, the top bracket 110 may be secured to the existing alternator mount. Accordingly, the additional alternator 102 may be mounted to the existing alternator mount via the top bracket 110.

As mentioned, the additional alternator 102 may be mounted to the existing alternator mount via the bottom bracket 120. For example, one or more foot flanges (e.g., foot flanges 134, 136) of the additional alternator 102 may each comprise a foot aperture. During the installation of the additional alternator 102, the foot aperture of each foot flange can be aligned with a mounting apertures in the one or more mounting flanges 130, 132 of the bottom bracket 120. A fastener can then be inserted through the foot aperture of the foot flange and the aperture in the mounting flange, thereby securing the additional alternator 102 to the bottom bracket 120. As described in step 920, the bottom bracket 120 may be secured to the existing alternator mount. Accordingly, the additional alternator 102 may be mounted to the existing alternator mount via the bottom bracket 120.

Figure 11:
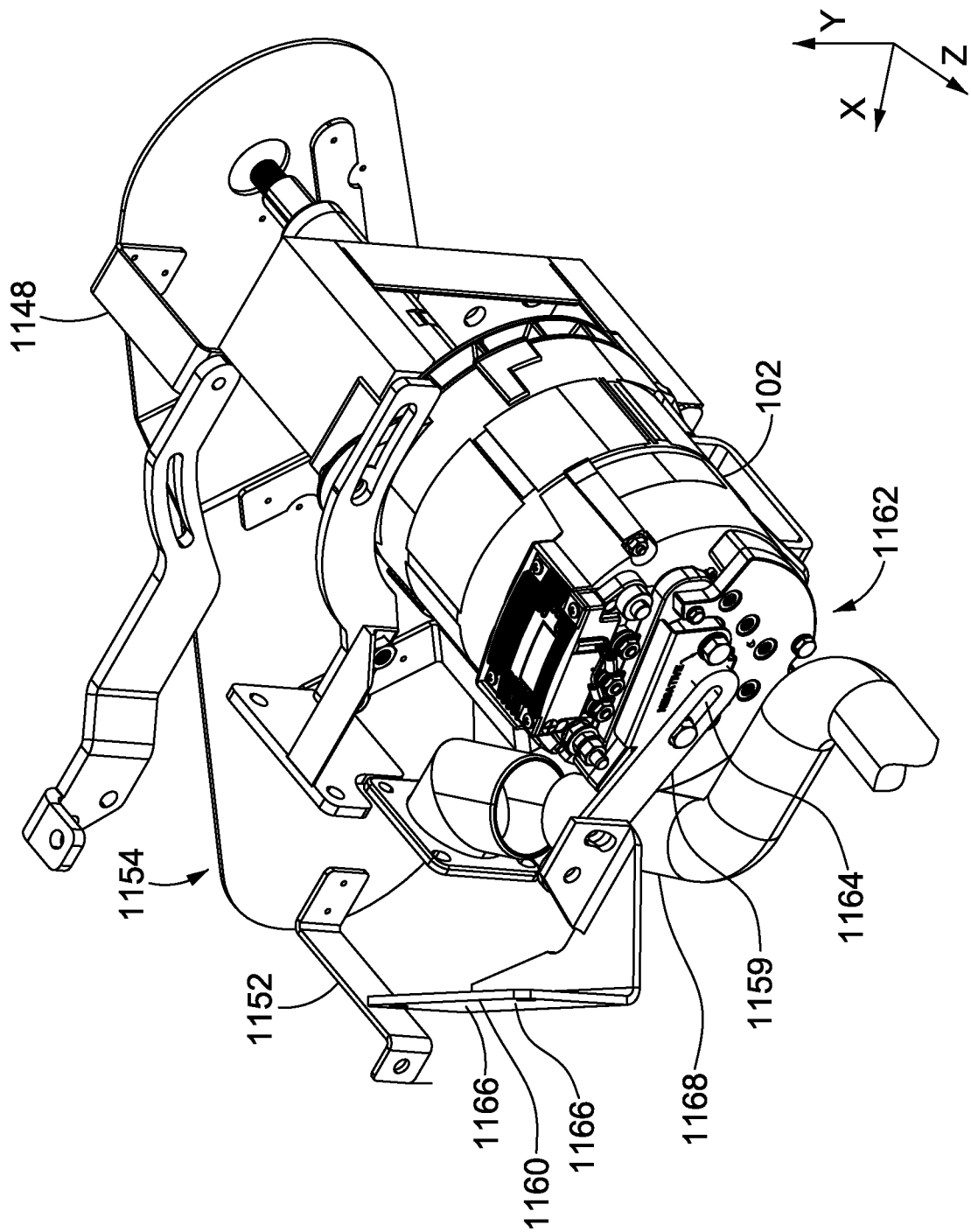
FIG. 11 is a rear perspective view of the additional alternator mounted to an existing alternator mounting bracket of FIG. 10.

FIGS. 10-11 are front and rear perspective views, respectively, of a mounting system 1000 for the additional alternator 102 in accordance with an alternate embodiment of the present invention. The mounting system 1000 is similar the mounting system 100 of FIG. 1. For instance, the mounting system 1000 includes the shaft 140 and the bottom bracket 120. As the shaft 140 and the bottom bracket 120 have been described in greater detail above, they will not be described in detail here. Additionally, similar to the mounting system 100, mounting system 1000 may offset the additional alternator 102 laterally, longitudinally, and vertically from an existing alternator, such as alternator 310. For instance, the additional alternator 102 may be offset laterally along the x-axis, vertically along the y-axis, and longitudinally along the z-axis from an existing alternator.

The mounting system 1000 includes a top bracket 1110. The top bracket 1110 includes a wall 1114 that extends from a first end 1116 to a second end 1118. The top bracket 1110 may be mounted to the additional alternator 102 at the first end 1116. For example, the wall may have a mounting aperture 1122 positioned at the first end 1116. The additional alternator 102 may be mounted to the top bracket 1110 through a fastener (e.g., a bolt, screw, or pin) that is inserted through the mounting aperture 1122 and into the flange aperture 152.

In some aspects, the mounting aperture 1122 can be an elongated slot having an arc. As such, the additional alternator 102 can be rotatably adjusted with respect to the top bracket 1110. The elongated slot may allow for a tensioning of one or more belts during installation of the additional alternator 102. As the top flange 150 travels along the elongated slot, the tension in one or more belts may be decreased or increased depending on the direction the top flange travels.

In some aspects, the second end 1118 of the top bracket 1110 is coupled (directly or indirectly) to an existing component of the engine. As illustrated, the second end 1118 is coupled to a mounting post 1120. The top bracket 1110 is coupled to the mounting post 1120 via one or more fasteners (e.g., a bolt, screw, or pin). The mounting post 1120 includes a flange 1124 that can be mounted to any existing component of the engine compartment such that the additional alternator 102 is supported. For example, the flange 1124 includes an aperture(s) 1126 that aligns with existing mounting apertures that already exist in the engine compartment. In some aspects, the aperture 1126 may align with an aperture in an engine block of the vehicle. By utilizing an existing aperture in an existing component of the engine compartment (e.g., the engine block), it reduces the resources for retrofitting a vehicle with an additional alternator. It should be appreciated that it is within the scope of the present invention that while the top bracket 1110 and the mounting post 1120 have been described as separate structures, they may be a unitary structure as opposed to two separate structures.

As illustrated in FIG. 10, the mounting system 1000 includes a bearing support system 1128. The bearing support system 1128 includes a C-shaped support member including a bearing (not shown) that rotatably couples to the shaft 140. As such, the shaft 140 is supported as it experiences a side load that creates a moment of force on the shaft based on the distal end 1144. The bearing support system 1128 includes a first member 1130 that is spaced apart from a second member 1132. The first member 1130 extends from a proximal end 1138 to a distal end 1140. The second member 1132 extends from a proximal end 1142 to a distal end 1144.

The proximal end 1138 of the first member 1130 includes an aperture that aligns with an aperture in the foot flange 136 of the additional alternator 102. Additionally, the aperture in the proximal end 1138 aligns with an aperture in the one or more mounting flanges in a bottom bracket (both of which are obscured from view based on the angle of the perspective), such as one or more mounting flanges 130 of bottom bracket 120 of FIG. 1. As such, in an in-mounted configuration, a single fastener may be used to couple the first member 1130, the foot flange 136, and the bottom bracket together.

The proximal end 1142 of the second member 1132 includes an aperture that aligns with an aperture in the top flange 150 of the additional alternator 102. Additionally, the aperture in the proximal end 1142 aligns with the mounting aperture 1122 of the top bracket 1110. As such, in an in-mounted configuration, a single fastener may be used to couple the second member 1132, the top flange 150, and the top bracket 110 together. As described above, in the illustrated embodiment the mounting aperture 1122 is an elongated slot forming an arc that allows the top flange 150 to travel with respect to the top bracket 1110 so as to adjust the tension in one or more belts. As such, it should be appreciated that the second member 1132 of the bearing support system 1128 is capable of traveling along an elongated slot as the additional alternator 102 moves with respect to the top bracket 1110. This allows the bearing support system 1128 to continue to support the shaft 104 as the additional alternator 102 moves.

In some aspects, the first member 1130 is coupled with the second member 1132 via an intermediate member 1134. For example, a distal end of the first member 1130 is coupled to the intermediate member 1134. Similarly, a distal end of a second member 1132 is coupled to the intermediate member 1134. The intermediate member 1134 includes an opening 1136 through which the shaft 140 extends. While not shown, a bearing may be rotatably coupled to the shaft 140 at or near the distal end 144. The bearing helps dissipate torsional forces on the shaft 140 as it experiences a side load due to extending a pulley (e.g., pulley 810) further away from the face of the additional alternator 102. In some aspects, the bearing is a flange bearing that couples to the intermediate member 1134.

As described in greater detail above, the proximal end 142 of the shaft 140 is coupled to the shaft 104 of the additional alternator 102. To secure the proximal end 142 to the additional alternator 102, the shaft 140 may include a flange 1147. In some aspects, the flange 1147 may be coupled to the shaft 140. For example, the flange 1147 may be a bolt-on flange that clamps down on the shaft 140. Alternatively, the flange 1147 and the shaft 140 may be a unitary structure.

The flange 1147 includes one or more apertures that align with one or more apertures of a fan of the additional alternator. A fastener may be used to mount the shaft 140 to the fan of the additional alternator via the one or more apertures in the flange 1147. It should be appreciated that the fan may rattle based on the shaft 140 extending the pulley further from the additional alternator. Mounting the shaft to the fan may mitigate the rattling of the fan.

Figure 12B:
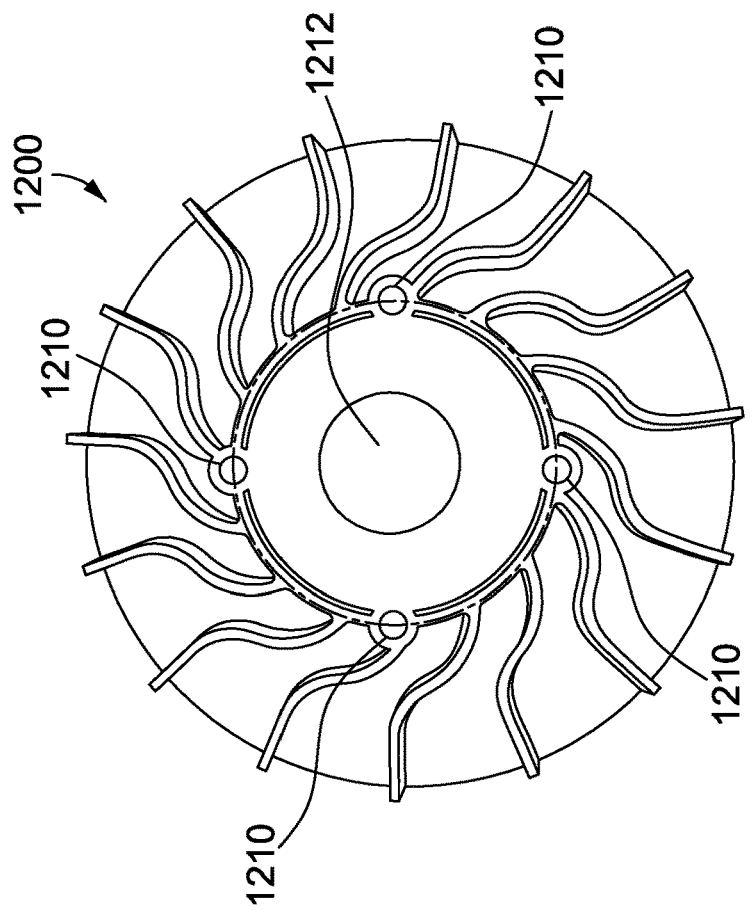
FIGS. 12A-B are each side elevation views of a fan plate before and after modification, respectively, in accordance with some embodiments of the present invention.
Figure 12A:
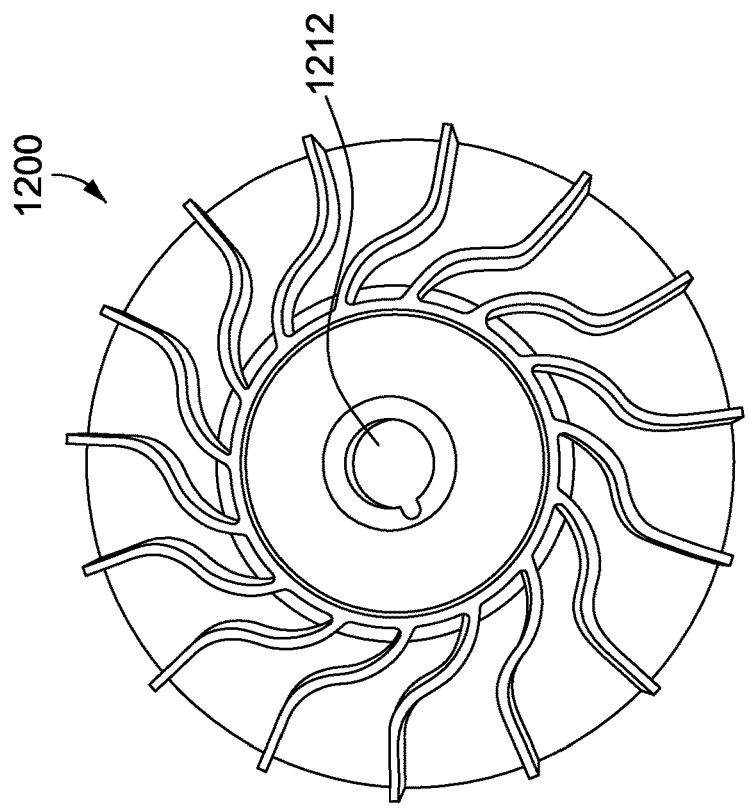

In some aspects, the fan of the additional alternator 102 may be modified to include one or more fan apertures that align with one or more apertures of the flange 1147. FIGS. 12A-B are each a side elevation views of a fan plate before and after modification, respectively, in accordance with some embodiments of the present invention. One or more fan apertures 1210 may be drilled through a fan plate 1200. The one or more fan apertures 1210 may be positioned concentrically around a center hole 1212. In some aspects, the one or more fan apertures 1212 may be positioned at a 90 degree reference angle from a central axis of the center hole 1212. As mentioned, the one or more fan apertures 1210 may receive a fastener from a flange of a shaft (such as flange 1147).

Additionally or alternatively, the center hole 1212 of the fan plate is enlarged. For instance, a diameter of a center hole 1212 may be enlarged from 0.9125 inches to 1.575 inches. It is contemplated that modifying the fan plate 1200 may also include removing one or more fan ridges from the fan plate.

Referring to both FIGS. 10-11, the mounting system 1000 includes a belt guard 1146 and a first belt guard bracket 1148 and a second belt guard bracket 1152 (shown in FIG. 11). The belt guard 1146 may be a member that extends proximate a pulley of the additional alternator 102 to a pulley of the existing alternator (e.g., existing alternator 310). The belt guard 1146 thus shields the one or more belts driving both the additional alternator 102 and the existing alternator.

The belt guard 1146 is mounted by one or more brackets. As illustrated, the belt guard 1146 is coupled to the first belt guard bracket 1148 at a first end 1150 and coupled to the second belt guard bracket 1152 at a second end 1154. In some aspects, the first belt guard bracket 1148 is coupled to a mounting bracket 1156. The mounting bracket 1156 may mount to the existing alternator. For instance, the existing alternator may be mounted to a mounting aperture 1158 with a fastener. In some embodiments, the mounting aperture 1158 is an elongated slot forming an arc. The mounting bracket 1156 includes a longer elongated slot than a stock mounting bracket. Having a longer elongated slot allows the existing alternator to travel further with respect to the mounting bracket 1156. This allows the existing alternator to be better positioned so as to accommodate the additional alternator 102. While not shown, the mounting bracket 1156 is coupled to an existing component of the engine similar to a stock mounting bracket in order to support both the additional alternator and the belt guard 1146.

Referring to FIG. 11, the additional alternator 102 is supported by one or more rear support members. For example, the rear of the additional alternator 102 is supported by a rear support member 1159. The rear support member 1159 is coupled to a rear portion 1162 of the additional alternator 102. For instance, the rear support member 1159 includes a mounting aperture 1164 that receives one or more fasteners so as to couple the rear support member 1159 to the rear portion 1162 of the additional alternator 102. In some embodiments, the mounting aperture 1164 is an elongated slot.

The rear support member 1159 couples to a mounting bracket 1160. In some aspects, the mounting bracket 1160 may be an L-shaped flange bracket. The mounting bracket 1160 includes one or more apertures 1166 (also illustrated in in FIG. 10) that allow the mounting bracket 1160 to be coupled to an existing component of the engine compartment. For instance, the one or more apertures 1166 may align with existing mounting apertures that already exist in the engine compartment. In some embodiments, the mounting bracket 1160 couples to an engine bracket supporting an air filter. As such, the mounting bracket 1160 may utilize an existing bracket in the vehicle to secure the rear of the additional alternator 102 to minimize resources needed to retrofit the vehicle with an additional alternator.

In the illustrated embodiment, the mounting system 1000 also includes a modified air intake system, including a modified air intake pipe 1168 and a modified air intake mount assembly. In some aspects, the additional alternator 102 may be mounted in a position where an existing air intake system would be located. As such, mounting the additional alternator 102 involves re-routing the existing air intake system. The modified air intake system may include one or more sections of air intake piping that accommodates the additional alternator 102.

From the foregoing it will be seen that this invention is one well adapted to attain all ends and objects hereinabove set forth together with the other advantages which are obvious and which are inherent to the method and apparatus. It will be understood that certain features and subcombinations are of utility and may be employed without reference to other features and subcombinations. This is contemplated by and is within the scope of the invention.

Further, the above detailed description described the illustrated embodiment. Alternate embodiments with modifications to various feature exist and are contemplated that still fall within the scope of the present invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A mounting system for mounting an additional alternator in combination with an existing alternator and using an alternator mount supporting an existing alternator, the alternator mount having a first member with a first aperture, the mounting system comprising:
    a top bracket comprising a first bracket aperture, the first bracket aperture configured to align with a top flange aperture in a top flange of the additional alternator; and
    a bottom bracket comprising one or more mounting flanges and a second bracket aperture that aligns with the first aperture of the first member of the alternator mount, wherein the one or more mounting flanges has a flange aperture that aligns with a foot flange aperture in a foot flange of the additional alternator.

2. The mounting system of claim 1, wherein the mounting system positions the additional alternator in a mounted position such that the additional alternator is alongside the existing alternator.

3. The mounting system of claim 1 further comprising a protective guard configured to shield the additional alternator.

4. The mounting system of claim 1 further comprising a protective guard configured to shield a pulley of the additional alternator, a belt driving the additional alternator, or both the pulley and the belt.

5. The mounting system of claim 1 further comprising a belt guard configured to shield one or more belts driving the additional alternator, the existing alternator, or both the additional alternator and the existing alternator.

6. The mounting system of claim 1, wherein the top bracket further comprises a first top wall, wherein the first bracket aperture extends through the first top wall.

7. The mounting system of claim 1, wherein the bottom bracket further comprises a first bottom wall, wherein the second bracket aperture extends through the first bottom wall.

8. The mounting system of claim 1 further a comprising a shaft adjacent to and extending perpendicular to a front face of the additional alternator, wherein the shaft comprises a first end and a second end, wherein the first end is configured to couple to the additional alternator and the second end is configured to attach to a first pulley.

9. The mounting system of claim 8, wherein the first pulley aligns with a second pulley of the existing alternator.

10. The mounting system of claim 8, wherein the first pulley and the second pulley are driven by a single belt.

11. A method for mounting an additional alternator to a vehicle having an existing alternator, the method comprising:

securing a top bracket to an existing component of an engine of the vehicle by aligning a first bracket aperture of the top bracket with a first aperture in a first member of the existing component of the engine;

securing a bottom bracket to an alternator mount supporting the existing alternator by aligning a second bracket aperture of the bottom bracket with a second aperture in a second member of the alternator mount; and mounting the additional alternator alongside the existing alternator utilizing the top and bottom brackets, wherein the additional alternator is mounted such that:

an aperture in a top alternator flange of the additional alternator is aligned with a mounting aperture of the top bracket, and an aperture in a foot alternator flange of the additional alternator is aligned with a mounting aperture of the bottom bracket.

12. The method of claim 11, wherein the additional alternator is mounted such that the additional alternator is offset laterally and longitudinally from the existing alternator.

13. The method of claim 12 further comprising mounting a belt guard to the alternator mount.

14. The method of claim 13, wherein the belt guard is mounted such that the belt guard extends proximate a pulley of the additional alternator.

15. The method of claim 13, wherein the belt guard is configured to shield one or more belts driving the additional alternator, the existing alternator, or both the additional alternator and the existing alternator.

16. The method of claim 11, wherein the top bracket comprises a first top wall, wherein the first bracket aperture extends through the first top wall.

17. The method of claim 11, wherein the bottom bracket comprises first bottom wall, wherein the second bracket aperture extends through the first bottom wall.

18. A mounting system for mounting an additional alternator in combination with an existing alternator and using an alternator mount supporting an existing alternator, the alternator mount having a first member with a first aperture, the mounting system comprising:

a top wall comprising a first bracket aperture configured to align with a top flange aperture in a top flange of the additional alternator;

a bottom wall comprising a second bracket aperture that aligns with the first aperture of the first member of the alternator mount; and one or more mounting flanges comprising a flange aperture that aligns with a foot flange aperture in a foot flange of the additional alternator.

19. The mounting system of claim 18 further comprising a belt guard configured to shield one or more belts driving the additional alternator, the existing alternator, or both the additional alternator and the existing alternator.

20. The mounting system of claim 19, wherein the belt guard comprises a first belt guard bracket that is coupled to a mounting bracket of the alternator mount.

\* \* \* \* \*